(12) United States Patent
Hahn et al.

(10) Patent No.: US 8,731,194 B2
(45) Date of Patent: May 20, 2014

(54) METHOD OF ESTABLISHING SECURITY ASSOCIATION IN INTER-RAT HANDOVER

(75) Inventors: Gene Beck Hahn, Gyeonggi-do (KR); Ae Ran Youn, Gyeonggi-do (KR); Sung Woong Ha, Gyeonggi-do (KR); Gi Won Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 12/738,391

(22) PCT Filed: Oct. 15, 2008

(86) PCT No.: PCT/KR2008/006080
§ 371 (c)(1),
(2), (4) Date: Apr. 16, 2010

(87) PCT Pub. No.: WO2009/051405
PCT Pub. Date: Apr. 23, 2009

(65) Prior Publication Data
US 2010/0228967 A1 Sep. 9, 2010

(30) Foreign Application Priority Data

Oct. 18, 2007 (KR) .................. 10-2007-0105219
Aug. 19, 2008 (KR) .................. 10-2008-0080904

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 9/32 | (2006.01) | |
| H04K 1/00 | (2006.01) | |

(52) U.S. Cl.
USPC ................ 380/247; 713/155; 713/168; 726/3

(58) Field of Classification Search
USPC ........... 370/331; 455/436–444; 713/151–155, 713/160–161, 168–171; 380/247–250
See application file for complete search history.

(56) References Cited

U.S. PATENT DOCUMENTS

| | | | |
|---|---|---|---|
| 2004/0121772 A1 | 6/2004 | Rue | |
| 2006/0171406 A1 * | 8/2006 | Kwon et al. | 370/419 |
| 2007/0210894 A1 * | 9/2007 | Park et al. | 340/5.2 |
| 2009/0119509 A1 * | 5/2009 | Cho et al. | 713/171 |
| 2010/0190500 A1 * | 7/2010 | Choi et al. | 455/436 |
| 2011/0274034 A1 * | 11/2011 | Rautiola et al. | 370/328 |

OTHER PUBLICATIONS

L. Chen, X. Cai, R. Sofia, and Z. Huang, A cross-layer fast handover scheme for mobile WiMAX, Proc. of Vehicular Technology Conference, Sep. 2007.*

(Continued)

Primary Examiner — Kambiz Zand
Assistant Examiner — Trong Nguyen
(74) Attorney, Agent, or Firm — Lee, Hong, Degerman, Kang & Waimey (57) ABSTRACT

A method of establishing security association during handover between heterogeneous networks in a radio access system is disclosed. A method of establishing security association before handover with a target base station included in a heterogeneous radio access network is performed comprises transmitting a request message to a service base station, the request message requesting the service base station to transfer authentication related information of a mobile station to a target network authentication server; and receiving a response message from the service base station before the handover with the target base station is performed, the response message including security related information used in a target network.

7 Claims, 6 Drawing Sheets

(56) References Cited

OTHER PUBLICATIONS

Lopez, R.M. et al.; "Network-Layer Assisted Mechanism to Optimize Authentication Delay During Habdoff in 802.11 Networks"; Fourth Annual International Conference on Mobile and Ubiquitous Systems: Networking & Services; MobiQuitos 2007, Aug. 2007; pp. 1-8.

Lim, Sun Hee, et al.; "A Fast and Efficient Authentication Protocoal for a Seamless Handover Between a WLAN and WiBro"; 2nd International Conference on Communication Systems Software and Middleware; COMSWARE 2007, Jan. 2007; p. 1-7.

* cited by examiner

METHOD OF ESTABLISHING SECURITY ASSOCIATION IN INTER-RAT HANDOVER

CROSS-REFERENCE TO RELATED APPLICATIONS

This application is the National Stage filing under 35 U.S.C. 371 of International Application No. PCT/KR2008/006080, filed on Oct. 15, 2008, which claims the benefit of earlier filing date and right of priority to Korean Application Nos. 10-2007-0105219, filed on Oct. 18, 2007, and 10-2008-0080904, filed on Aug. 19, 2008.

TECHNICAL FIELD

The present invention relates to a radio access system, and more particularly to, a method of establishing security association during handover between heterogeneous radio access networks.

BACKGROUND ART

Hereinafter, a method of establishing security association when a mobile station performs handover from a current network to another radio network will be described.

The IEEE 802.16 standard supports a privacy and key management (PKM) protocol. The PKM protocol means a protocol which safely distributes key related data from a base station a mobile station. If this PKM protocol is used, the mobile station and the base station can share the key related data, and the base station can control access of the network.

The PKM protocol supports both bi-directional authentication and unidirectional authentication. Also, the PKM protocol supports periodical re-authentication and key update procedure, Extensible Authentication Protocol (EAP: IETE RFC 3748) based authentication mode, X.509 digital credential (IETE RFC 3280) based authentication mode which uses Rivest Shamir Adleman (RSA) public key encryption algorithm, and a mode for performing EAP based authentication procedure after performing RSA based authentication procedure. Namely, the PKM protocol is a protocol, which performs key exchange between the mobile station and the base station using a powerful encryption algorithm.

A PKM sublayer can use various authentication protocols. For example, examples of the authentication protocols include RSA protocol and an extensible authentication protocol (EAP). Hereinafter, an EAP to which extensibility and flexibility are given so as to allow various kinds of authentication modes will be described.

There is provided the IEEE 802.1x standard, which uses the EAP for wire and wireless LAN. The IEEE 802.1x standard defines a format and procedure of EAPoL (EAP over LAN) frame that can transfer EAP message, and prescribes a procedure of allowing network access only if a user acquires a physical port license of a radio access point from an authentication server.

Figure 1:
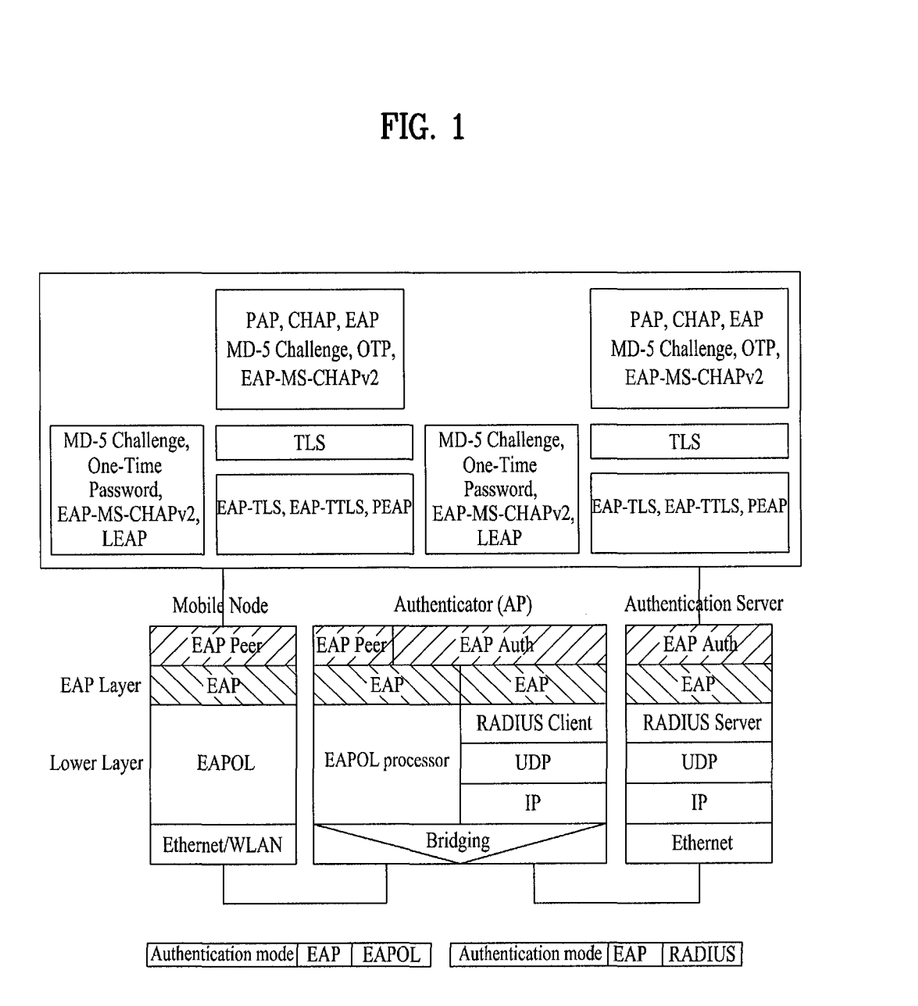
FIG. 1 is a diagram illustrating an example of a hierarchical structure and elements of a 802.1x system.

FIG. 1 is a diagram illustrating an example of a hierarchical structure and elements of an 802.1x system.

In FIG. 1, an access point which supports 802.1x supports protocol stack of almost all layers such as Internet protocol (IP), user datagram protocol (UDP), a remote authentication dial in user service (RADIUS) client function, as well as EAPoL processing function. Hereinafter, the 802.1x hierarchical structure will be described.

Referring to FIG. 1, the 802.1x hierarchical structure is as follows. A lower layer which transfers EAP frame can include EAPoL, point-to-point (PPP) protocol, RADIUS, etc. The EAP layer serves to transmit, receive, and relay EAP packets, and performs packet retransmission and repeated reception sensing functions. The EAP layer classifies EAP packets using a code value of an EAP packet header and then transfers the classified EAP packets to an EAP Peer layer or an EAP authenticator layer. The EAP Peer/Authenticator layers serve to transfer EAP packets to a corresponding EAP authentication mode processing layer with reference to a type region of the EAP packets.

Figure 2:
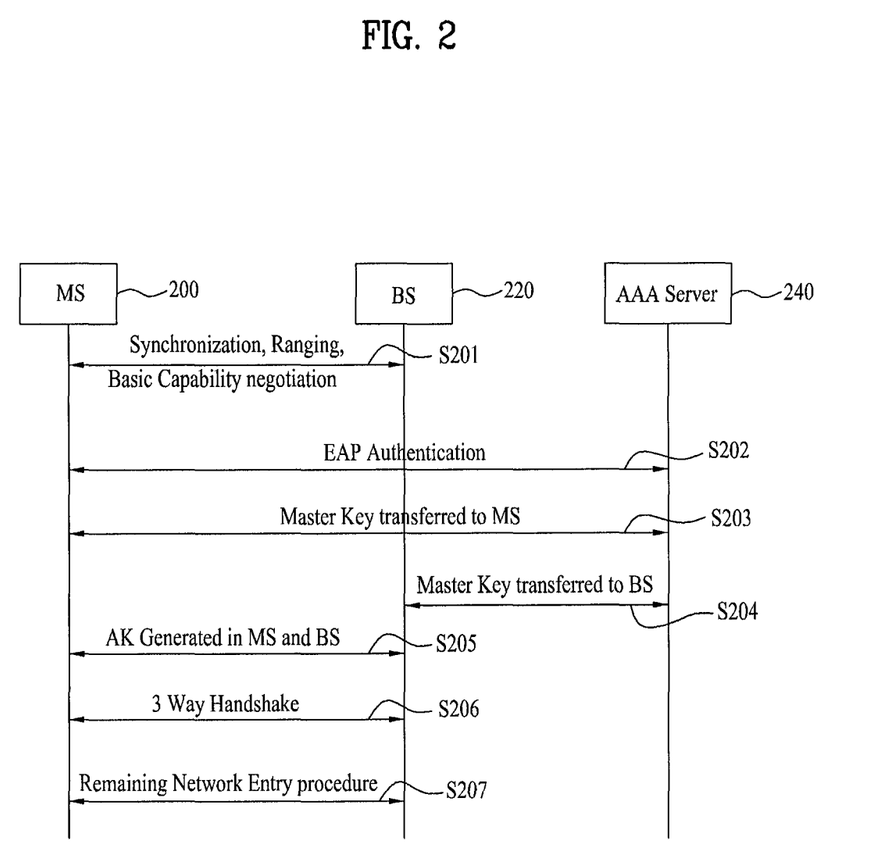
FIG. 2 is a flow chart illustrating an authentication procedure for a mobile station of a general IEEE 802.16 system.

FIG. 2 is a flow chart illustrating an authentication procedure for a mobile station of a general IEEE 802.16 system.

FIG. 2 relates to an authentication procedure currently in service, and illustrates a schematic flow of a message and a transmission type of information. However, messages, which include information transmitted to and received from a mobile station (MS) 200, a base station (BS) 220, or an authentication authorization accounting (AAA) server 240, may have various types.

Referring to FIG. 2, when the mobile station 200 intends to enter a network, the mobile station acquires synchronization with the base station 220, performs ranging, and performs basic capability negotiation with the base station through SBC-REQ/RSP messages (S201).

Table 1 illustrates an example of the SBC-REQ/RSP message for basic capability negotiation between the mobile station and the base station.

TABLE 1

SBC-REQ/RSP{
    Essential parameter
    Physical Parameters Supported
    Bandwidth Allocation Support
    Selective parameter
    Capabilities for construction and transmission of MAC
PDUs
    PKM Flow Control
    Authorization Policy Support
    Maximum Number of Supported Security Association
    Security Negotiation Parameters
    HMAC-CMAC Tuple
}

In Table 1, the SBC-REQ (Subscribe Station Basic Request) message is transmitted by the mobile station during initialization. The base station transmits the SBC-RSP (Subscribe Station Basic Response) message to the mobile station in response to the SBC-REQ message. The SBC-REQ/RSP messages are to negotiate basic capability between the mobile station and the base station.

Basic capability negotiation is intended to report basic capability of the mobile station to the base station directly after ranging ends. In Table 1, the SBC-REQ/RSP messages include parameters that can selectively be included, in addition to necessarily required parameters.

Security association (SA) means a collection of security information shared by the base station and one or more mobile stations to support safe communication over the entire of IEEE 802.16 based network. In Table 1, examples of security association include an authorization policy support field and security negotiation parameters.

The authorization policy support field is one of fields included in the SBC-REQ/RSP messages, and specifies an authorization policy to be negotiated and synchronized between the mobile station and the base station. If the authorization policy support field is omitted, the mobile station and the base station should use IEEE 802.16 security having X.509 credential and RSA public key algorithm as an authorization policy.

Table 2 illustrates an example of the authorization policy support field, which is generally used.

TABLE 2

| Type | Length | Content | Region |
|---|---|---|---|
| | 1 | Bit #0: IEEE 802.16 Privacy Supported<br>Bits #1-7: Reserved, shall be set to zero | SBC-REQ, SBC-RSP |
| | 1 | Bit #0: RSA-Based Authorization at the Initial Network Entry<br>Bit #1: EAP-Based Authorization at Initial Network Entry<br>Bit #2: Authenticated EAP-based Authorization at the initial Network Entry<br>Bit #3: Reserved, set to 0<br>Bit #4: RSA-Based Authorization at Reentry<br>Bit #5: EAP-Based Authorization at Reentry<br>Bit #6: Authenticated EAP-Based Authorization Reentry<br>Bit #7: reserved, shall be set to 0 | |

The security negotiation parameter field that can be included in Table 2 specifies whether to support security capabilities to be negotiated before initial authorization or reauthorization is performed.

Table 3 illustrates an example of the security negotiation parameter field which is generally used.

TABLE 3

| Type | Length | Contents | Region |
|---|---|---|---|
| 25 | variable | The Compound field contains the subattributes as defined in the table below | SBC-REQ, SBC-SRP |

| Subattribute | Contents |
|---|---|
| PKM Version Support | Version of Privacy Sublayer Supported |
| Authorization Policy Support | Authorization Policy to Support |
| Message Authentication code Mode | Message Authentication Code to Support |
| PN Window size | Size Capability of the Receiver PN Window per SAID |

Meanwhile, PKM Version Support field of Table 3 specifies PKM version. Namely, both the mobile station and the base station should negotiate only one PKM version.

Table 4 illustrates an example of the PKM version support field, which is generally used.

TABLE 4

| Type | Length | Value |
|---|---|---|
| 25.1 | 1 | Bit #0: PKM Version 1<br>Bit #1: PKM Version 2<br>Bits #2-7: reserved value, setting to '0' |

Referring to FIG. 2, the mobile station 200 requests an authentication authorization accounting server (AAA server) 240 to authenticate an extensible authentication protocol (EAP) through the base station 220. The AAA server 240 performs authentication of a user through an EAP authentication method in response to the request of the mobile station 200 (S202).

An example of the EAP authentication method includes a method of using X.509 credential in case of EAP-TLS. Also, an example of the EAP authentication method includes a method of using a specific type credit credential such as a subscriber identity module (SIM) in case of EAP-SIM. However, an RSA authentication method, which uses an encryption algorithm based on a public key encryption, may be used in accordance with requirements of the system.

In the step S202, if authentication of the mobile station (or user) is successfully completed, the AAA server 240 generates a master session key (MSK) through the EAP based authentication method. The AAA server transmits MSK to the base station (S203). The base station 220 transmits the MSK received from the AAA server 240 to the mobile station 200 so as to share it with the mobile station 200 (S204).

The mobile station 200 and the base station 220 can generate an authentication key (AK) using PMK (EAP based authentication method) (S205). Also, the mobile station 200 or the base station 220 can generate the AK using the MS. The AK can be used to generate a traffic encryption key (TEK) for communication between the mobile station 200 and the base station 220.

The mobile station 200 and the base station 220 share TEK through 3-way handshaking (S206). The 3-way handshaking is performed through handshaking of three stages, such as SA-TEK challenge, SA-TEK request, and SA-TEK response. At this time, the mobile station 200 and the base station 220 can generate and share TEK used to encode actual data.

The mobile station 200 and the base station 220, which have generated the AK by performing the authentication procedure, can share the TEK. Afterwards, the mobile station can perform a network entry procedure (S207).

DETAILED DESCRIPTION OF THE INVENTION

Technical Problems

As described above, security association during handover between heterogeneous radio access networks is not disclosed in the mobile communication system, which is generally used. For example, if the mobile station, which uses IEEE 802.16 network, performs handover for other radio access system, a method of establishing security association for the handover is not defined. Accordingly, the method of establishing security association for the handover is required.

Furthermore, when a multi-mode mobile station performs handover between heterogeneous radio access networks under the general communication environment, the mobile station should newly perform an authentication and encryption key acquisition procedure when performing second layer handover with a new network. However, in this case, it is expected that time delay will be caused in providing user service, and data loss may be caused.

One of basic requirements of the IEEE 802.16m system is that the IEEE 802.16m system should access another radio access systems. Accordingly, when the mobile station performs handover from the IEEE 802.16 broadband radio access system to another radio access system or vice versa, a method of establishing fast security association is required.

Accordingly, the present invention is directed to a method of establishing fast security association, which substantially obviates one or more problems due to limitations and disadvantages of the related art.

An object of the present invention is to provide a method of establishing fast security association, in which service quality is prevented from being deteriorated when a mobile station performs handover for heterogeneous networks.

Another object of the present invention is to provide a method of establishing fast security association, in which a service authentication server of a radio access network transfers authentication as to a corresponding mobile station to a target network authentication server without specified authentication for the corresponding mobile station when the mobile station performs handover for heterogeneous networks.

Technical Solutions

To achieve these objects and other advantages and in accordance with the purpose of the invention, as embodied and broadly described herein, the present invention relates to a radio access system, and more particularly to, a method of establishing security association during handover between heterogeneous radio access networks.

In one aspect of the present invention, a method of establishing security association before handover with a target base station included in a heterogeneous radio access network is performed comprises transmitting a request message to a service base station, the request message requesting the service base station to transfer authentication related information of a mobile station to a target network authentication server; and receiving a response message from the service base station before the handover with the target base station is performed, the response message including security related information used in a target network.

Before transmitting the request message, the method further comprises transmitting a message to the service base station, the message requesting an inter-RAT authorization policy support parameter; and receiving the message including the parameter from the service base station.

At this time, the authentication related information includes information representing whether a serving network of the mobile station has successfully performed authentication. Also, the security related information includes RAND and Kc if the target network is a GSM system, and includes RAND, AUTN, CK and IK if the target network is a UMTS system. The request message is a PKM request message PKM-REQ, and the response message is a PKM response message PKM-RSP.

In another aspect of the present invention, a method of establishing security association before handover with a target base station included in a heterogeneous radio access network is performed comprises receiving a request message requesting transfer of authentication related information of a mobile station to a target network authentication server; transmitting a message including the authentication related information of the mobile station to a serving network authentication server; receiving a message including security related information used in the target network from the serving network authentication server; and transmitting the message including security related information to the mobile station.

Before receiving the request message requesting transfer of authentication related information of the mobile station to the target network authentication server, the method further comprises receiving a message from the mobile station, the message requesting an inter-RAT authorization policy support parameter; and transmitting the message including the parameter to the mobile station. In this case, the authentication related information includes information representing whether a serving network of the mobile station has successfully performed authentication. Also, the security related information includes RAND and Kc if the target network is a GSM system, and includes RAND, AUTN, CK and IK if the target network is a UMTS system.

In still another aspect of the present invention, a method of establishing security association before handover with a target base station included in a heterogeneous radio access network is performed comprises receiving a message from a service base station, the message including authentication related information of a mobile station; transmitting a message including the authentication related information and requesting security related information used in a target network to a target network authentication server; receiving the message including security related information from the target network authentication server; and transmitting the security related information to the service base station.

In this case, the authentication related information includes information representing whether a serving network of the mobile station has successfully performed authentication. Also, the security related information includes RAND and Kc if the target network is a GSM system, and includes RAND, AUTN, CK and IK if the target network is a UMTS system.

In further still another aspect of the present invention, a method of establishing security association before handover with a target base station included in a heterogeneous radio access network is performed comprises receiving a message including authentication related information of a mobile station and requesting security related information used in a target network from a service authentication server; searching the security related information used in the target network; and transmitting the searched security related information to the service authentication server before handover is performed. In this case, the authentication related information includes information representing whether a serving network of the mobile station has successfully performed authentication. Also, the security related information includes RAND and Kc if the target network is a GSM system, and includes RAND, AUTN, CK and IK if the target network is a UMTS system.

In further still another aspect of the present invention, a method of establishing security association before handover with a target base station included in a heterogeneous radio access network is performed comprises transmitting an authentication transfer request message to a service base station, the authentication transfer request message including authentication related information of a mobile station; transmitting an authentication information transfer request message from the service base station to a service network authentication server, the authentication information transfer request message including the authentication related information; transmitting a security context transfer request message from the service network authentication server to a target network authentication server, the security context transfer request message including the authentication related information and requesting security related information of a target network; searching the security related information used in the target network, through the target network authentication server; transmitting a security context transfer response message to the service network authentication server, the security context transfer response message including the searched security related information; transmitting an authentication information transfer response message from the service authentication server to the service base station, the authentication information transfer response message including the security related information; and transmitting an authentication transfer response message from the service base station to the mobile station before the handover is performed, the authentication transfer response message including the security related information used in the target network.

Advantageous Effects

According to the present invention, the following advantages can be obtained.

First, the mobile station can efficiently perform handover for heterogeneous radio access networks.

Second, before the mobile station performs handover for a target base station included in heterogeneous radio access networks, it is possible to improve service quality during handover by establishing fast security association with the target network (heterogeneous network) authentication server. For example, when the mobile station which receives a service from the IEEE 802.16 (WiMAX) system performs handover for heterogeneous radio access networks such as 3GPP network, using security related information of the target network previously acquired before handover, thereby obtaining a seamless service.

Third, the heterogeneous authentication servers can identify whether the mobile station can access a corresponding network when the mobile station performs handover for the heterogeneous networks by exchanging the authentication result of the mobile station with each other. Accordingly, the authentication servers can transfer security contexts generated for specialized confidentiality and integrity to a radio network through pre-authentication protocol or AAA protocol not EAP level between AAA servers.

Finally, it is possible to support dynamic mobility between heterogeneous networks of the mobile station through the method suggested in the present invention. Also, when the mobile station performs handover for the target base station of heterogeneous networks, load and delay that may occur in establishing security association can be reduced.

BEST MODE FOR CARRYING OUT THE INVENTION

In order to the aforementioned technical problems, the present invention relates to a radio access system, and more particularly to, a method of establishing security association during handover between heterogeneous radio access networks.

Hereinafter, structures, operations, and other features of the present invention will be understood readily by the preferred embodiments of the present invention, examples of which are illustrated in the accompanying drawings. Also, specific terminologies used hereinafter are provided to assist understanding of the present invention, and various modifications can be made in such terminologies within the range that does not depart from technical spirits of the present invention.

The following embodiments are achieved by combination of structural elements and features of the present invention in a predetermined type. Each of the structural elements or features may be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), or access point. Also, the mobile station (MS) may be replaced with terms such as user equipment (UE), Subscriber Station (SS), and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of radio access systems, IEEE 802 system, 3GPP system, 3GPP LTE system and 3GPP2 system. Namely, steps or parts, which are not described in the embodiments of the present invention to clearly disclose technical spirits of the present invention, can be supported by the above standard documents. Also, all terminologies disclosed herein can be described by the above standard documents. Particularly, the embodiments of the present invention can be supported by one or more of the standard documents of the IEEE 802.16 system, i.e., P802.16-2004, P802.16e-2005, and P802.16Rev2.

Figure 3:
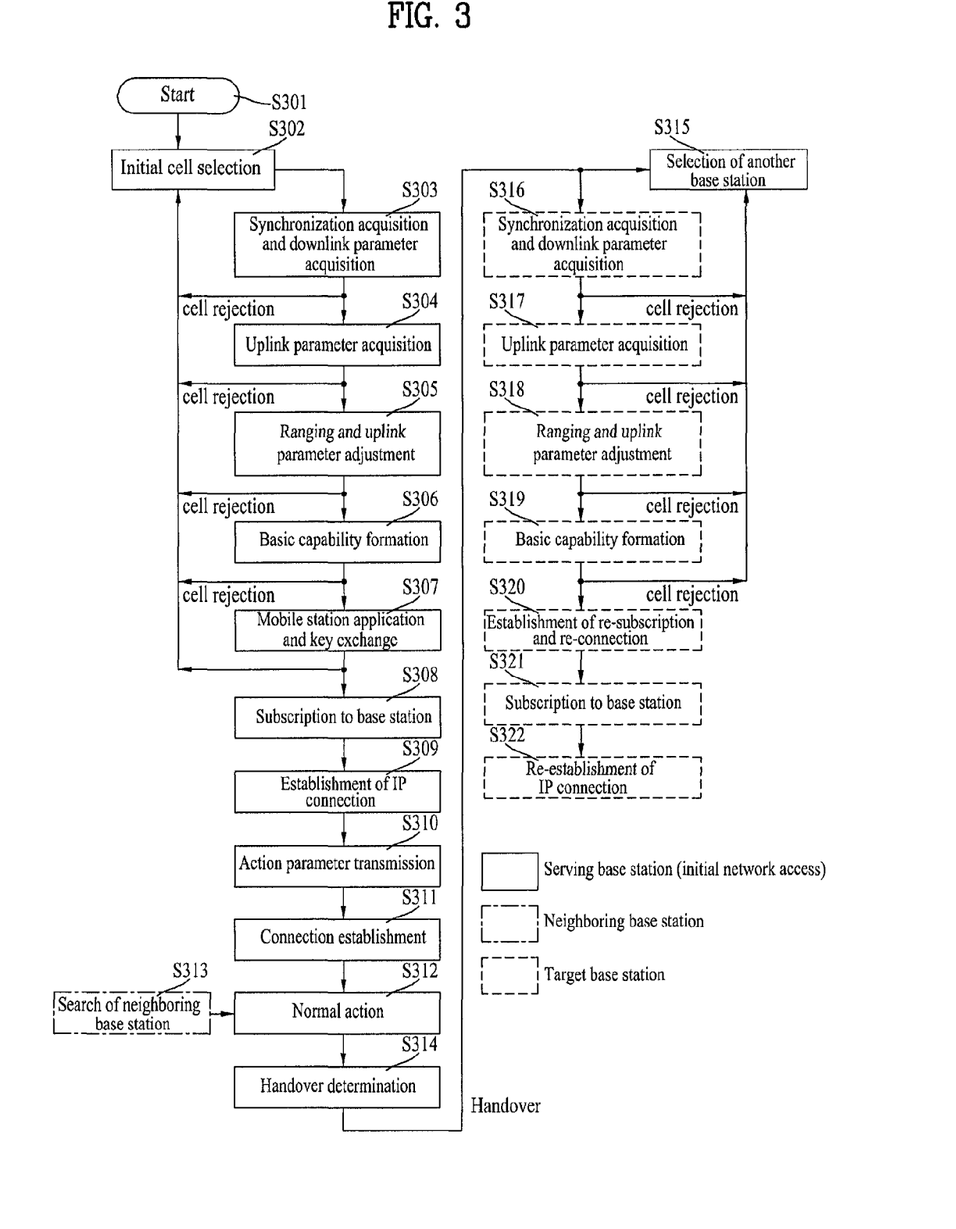
FIG. 3 is a flow chart illustrating handover and initial network entry procedure.

FIG. 3 is a flow chart illustrating handover and initial network entry procedure.

Referring to FIG. 3, the mobile station selects a cell during handover and initial network entry (S301, S302). Cell selection is to perform scanning or ranging with at least one base station to find a proper base station for network connection or handover. The mobile station should perform scheduling for a scan period or a sleep period to determine initial network entry to the base station or the possibility of handover to a target base station.

The mobile station acquires synchronization with a service base station and downlink parameters during initial network entry (S303). The service base station means a base station, which provides a service in a network where the mobile station currently intends to enter. The mobile station which has acquired synchronization with the service base station acquires uplink parameters to the service base station (S304), performs a ranging procedure with the service base station and adjusts uplink parameters (S305).

The mobile station and the service base station form basic capability for communication through the above steps (S306). The service base station applies the mobile station and exchanges a key (S307). Thus, the mobile station is subscribed to the service base station (S308), and Internet protocol (IP) connection is established in the mobile station (S309).

The service base station performs a communication procedure of the mobile station by transmitting action parameters to the mobile station (S310). Also, connection between the mobile station and the service base station is established (S311), so that the mobile station and the base station can perform normal operation (S312). The mobile station continues to search a neighboring base station while the service base station is performing the normal operation (S313). This is to search a base station that can provide a better service due to service quality provided by the service base station, which may be deteriorated as the mobile station moves away from the service base station. Accordingly, a neighboring base station, which provides a better service than that of the service base station, is referred to as a target base station. The mobile station performs handover by searching the target base station.

Generally, handover occurs when the mobile station moves a cell region from the service base station to the target base station. Handover means that the mobile station converts a radio interface, a service flow and a network node from the service base station to the target base station, and starts as the mobile station, the service base station and a network manager determine it (S314).

The mobile station selects the target base station (S315), and acquires synchronization with the target base station and downlink parameters (S316). The mobile station acquires uplink parameters of the target base station (S317), and adjusts ranging and uplink parameters with the target base station (S318). At this time, if the mobile station has previously received NBR-ADV message including target base station identifier, its frequency, and its uplink/downlink channel descriptors (UCD/DCD), scan and synchronization procedures can be simplified. If the target base station has received handover report from the service base station through a backbone network, it can provide a non-contention based initial ranging chance to an uplink-map (UL-MAP).

The mobile station and the target base station form basic capability through the above steps (S319), and start a network re-entry procedure by performing ranging. Also, the mobile station is re-subscribed and re-connected to the target base station (S320).

Thus, the mobile station is subscribed to the target base station (S321), and IP connection of the target base station is re-established in the mobile station (S322). As a result, the target base station serves as the service base station to provide a service to the mobile station.

Handover in FIG. 3 will be described again. The mobile station can select a cell through information of neighboring base stations obtained by scanning, and can determine handover from the service base station to the target base station. If the mobile station determines handover, it performs synchronization with the target base station, and also performs a ranging procedure. Afterwards, reauthorization for the mobile station is performed. At this time, the target base station can request the service base station to provide information of the mobile station, through a backbone network.

The handover and network re-entry procedures can be simplified in accordance with information owned by the target base station and related to the mobile station. Also, several network entry procedures can be omitted in accordance with the information of the mobile station, which is owned by the target base station.

In order to perform the method suggested in the embodiments of the present invention, several security requirements exist as follows.

1) A dual-mode mobile station has UICC or universal subscriber identify module (USIM) as well as information for association with IEEE 802.16 network to support handover between heterogeneous networks, thereby using information stored in the UICC or the USIM.

2) In case of a radio access network (for example, 3GPP network) in addition to IEEE 802.16 network, it is preferable that security credentials shared by the mobile station and the network for a long time are stored in SIM card or UICC card.

3) Heterogeneous radio access networks other than IEEE 802.16 network, such as 3GPP network, can be associated with EAP based authentication server as suggested in the present invention, wherein the EAP based authentication server supports whether protected authentication has been successfully performed or has been failed.

4) The IEEE 802.16 network enters into a roaming agreement for association with other heterogeneous radio access network.

5) Success or failure of authentication exchanged between the authentication server of the service network and the authentication server of the target network and protection for security contexts should be provided. Namely, authorization information should be transferred safely between authentication servers through a pre-authentication protocol or AAA protocol.

6) For protection of user identifiers (for example, IMSI, TMSI), these identifiers should not be disclosed.

Figure 4:
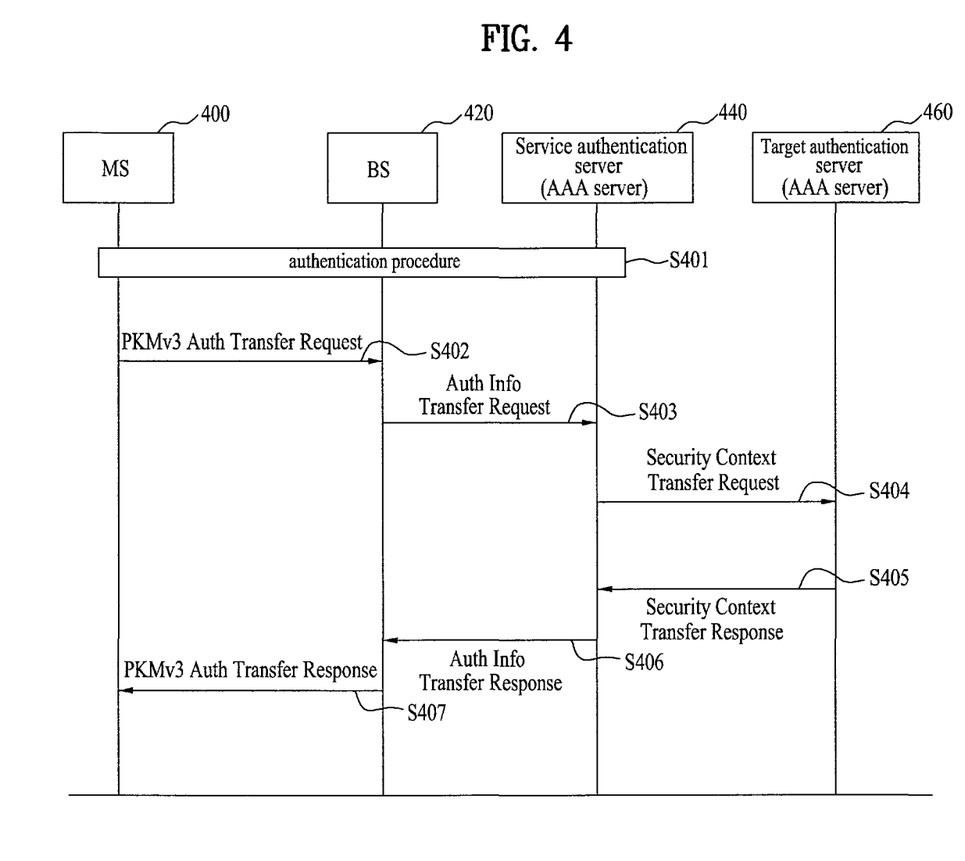
FIG. 4 is a diagram illustrating a method of establishing security association before a mobile station performs handover from a service network to a target network in accordance with one embodiment of the present invention.

FIG. 4 is a diagram illustrating a method of establishing security association before a mobile station performs handover from a service network to a target network in accordance with one embodiment of the present invention.

In FIG. 4, a communication environment can include a mobile station (MS) 400, a base station (BS) 420, a service AAA server 440, and a target AAA server 460.

The message used in FIG. 4 is described to effectively represent technical spirits of the embodiment according to the present invention. Accordingly, any message, which performs the function of the message used in FIG. 4, may be used.

In FIG. 4, the service AAA server 440 and the target AAA server 460 represent heterogeneous radio access networks. The heterogeneous radio access networks include networks supported by 3GPP and 3GPP2 as well as IEEE 802 based wire and wireless networks except for the IEEE 802.16 network. In the embodiment of the present invention, it is assumed that the service AAA server 440 is included in the IEEE 802.16 network and the target AAA server 460 is included in the 3GPP network.

The embodiments of the present invention disclose methods of supporting handover between heterogeneous radio access networks. Namely, the embodiments of the present invention provide methods of establishing security association for providing a seamless service to a mobile station, which performs handover between heterogeneous radio access networks without causing load to the networks.

Referring to FIG. 4, the mobile station 400, the base station 420, and the service AAA server 440 initially perform mutual authentication procedure (S401).

In the step S401, the basic capability negotiation procedure between the mobile station and the base station is performed by exchange between the SBC-REQ message and the SBC-RSP message after ranging ends. Namely, the mobile station 400 notifies the base station of its capability, and in response to this, the base station notifies the mobile station of a common part between its capability and the capability of the mobile station. In order to support the embodiments of the present invention, the SBC-REQ and SBC-RSP messages can include inter-RAT authorization policy support parameters between heterogeneous radio access networks.

Table 5 illustrates an example of the SBC-REQ/RSP messages corrected for handover between heterogeneous radio access networks.

TABLE 5

SBC-REQ/RSP{
    Essential parameter
        Physical Parameters Supported
        Bandwidth Allocation Support
    Selective parameter
        Capabilities for construction and transmission of
MAC PDUs
        PKM Flow Control
        Authorization Policy Support
        Inter_RAT Authorization Policy Support
        Maximum Number of Supported Security Association
        Security Negotiation Parameters
        HMAC-CMAC Tuple
}

In Table 5, the corrected SBC-REQ and SBC-RSP messages can include inter-RAT authorization policy support parameter. The inter-RAT authorization policy support parameter specifies an authorization policy to be negotiated and synchronized between the mobile station and the network when the mobile station performs handover to another radio access network different from a radio access network where the mobile station currently receives a service.

Namely, the inter-RAT authorization policy support parameter is a field included in SBC-REQ/RSP management encoding, similarly to the conventional authorization policy support. If this field is omitted, the mobile station and the base station should use IEEE 802.16 security having X.509 credential and RSA public key algorithm or EAP as an authorization policy. Accordingly, if the mobile station performs handover for another network other than the IEEE 802.16 network, the mobile station should perform authentication again with respect to the authentication server of the corresponding network and acquire security key.

The following Table 6 illustrates an example of the inter-RAT authorization field between heterogeneous radio access networks.

TABLE 6

| Type | Length | Value | Region |
|---|---|---|---|
| | 1 | Bit 0: IEEE 802.16 Privacy Supported<br>Bits 1-7: Reserved, shall be set to zero | SBC-REQ, SBC-RSP |

Meanwhile, in Table 5, the security negotiation parameter field can include security capabilities to be negotiated before authorization if the mobile station performs handover for another radio access network.

The following Table 7 illustrates an example of an attribute of the security negotiation parameter that can be used in the embodiment of the present invention.

TABLE 7

| Type | Length | Value | Region |
|---|---|---|---|
| 25 | Variable | The Compound Field contains the subattributes as defined in the table below | SBC-REQ, SBC-RSP |

| Subattribute | Content |
|---|---|
| PKM Version Support | Version of Privacy Sublayer Supported |
| Authorization Policy Support | Authorization Policy to Support |
| Inter-RAT Authorization Policy Support | Inter-RAT Authorization Policy to support |
| Message Authentication code Mode | Message Authentication Code to Support |
| PN Window size | Size Capability of the Receiver PN Window per SAID |

Table 7 specifies an attribute of the corrected security negotiation parameter field.

The following Table 8 illustrates another example of an inter-RAT authorization policy support field included in Table 7.

TABLE 8

| Type | Length | Value |
|---|---|---|
| ?? | ?? | Bit #0: RSA-Based Authorization at Inter-RAT Handover<br>Bit #1: EAP-Based Authorization Inter-RAT Handover<br>Bit #2-#7: Reserved, shall be set to 0 |

Referring to Table 8, the inter-RAT authorization policy support field can have a size of 1 bit or more. The inter-RAT authorization policy support field can represent whether RSA based authentication or EAP based authentication will be used during inter-RAT handover.

The following Table 9 illustrates a PKM version support field. The PKM version support field specifies a PKM version. Namely, both the mobile station and the base station should negotiate only one PKM version.

TABLE 9

| Type | Length | Value |
|------|--------|-------|
| 25.1 | 1 | Bit #0: PKM Version 1<br>Bit #1: PKM Version 2<br>Bit #2: PKM Version 3<br>Bit #3-7: Reserved, shall be set to 0 |

The mobile station, the base station and the service authentication server can mutually negotiate whether to support inter-RAT authorization policy.

Referring to FIG. 4 again, type or information of a neighboring network where the mobile station 400 intends to perform handover is obtained by scanning, and an action timing or period of scanning depends on actual implementation or operation policy of the network. Since it is assumed that multi-modes of network access nodes are supported in the embodiment of the present invention, the mobile station 400 can provide a plurality of radio standards simultaneously and establish connection with one or more radio interfaces.

In order to establish fast security association during handover between heterogeneous networks as suggested in the embodiment of the present invention, the mobile station and the base station can use privacy key management (PKM) messages such as PKM request message PKM-REQ and PKM response message PKM-RSP. The PKM messages can be included in a management message payload. The PKM messages can be transferred through MS primary management connection of the mobile station.

The following Table 10 illustrates an example of PKM MAC message.

TABLE 10

| Type | Name | Content |
|------|------|---------|
| 9 | PKM-REQ | Key management protocol request (MS-> BS) |
| 10 | PKM-RSP | Key management protocol response (BS->MS) |

The following Table 11 illustrates an example of a format of the PKM request message PKM-REQ.

TABLE 11

| Syntaxes | Size (bit) | Content |
|----------|------------|---------|
| PKM-REQ_Message_Format( ) {<br>  Management Message Type = 9<br>  code<br>  PKM Identifier<br>  TLV Encoded Attributes<br>} | <br>8<br>8<br>8<br>variable | <br><br><br><br>TLV-Specific |

The following Table 12 illustrates an example of a format of the PKM response message PKM-REQ.

TABLE 12

| Syntaxes | Size (bit) | Content |
|----------|------------|---------|
| PKM-RSP_Message_Format( ) {<br>  Management Message Type = 10<br>  code<br>  PKM Identifier<br>  TLV Encoded Attributes<br>} | <br>8<br>8<br>8<br>variable | <br><br><br><br>TLV-Specific |

The PKM messages included in Table 11 and Table 12 include as code, PKM identifier, and TLV encoded attribute parameters. The code field has a length of one byte, and specifies a type of PKM packets. If packets having an invalid code are received, the corresponding packets are deleted.

The PKM identifier field can have a length of one byte, and the mobile station can use the PKM identifier to associate a response of the base station with its request. Also, a client and a server can exchange authentication data, authorization data, and key management data with each other using an attribute field (for example, PKM attribute). The PKM packet type has its unique compulsive or selective attributes. At this time, there are no requirements in the order of the attributes in the PKM messages unless described specifically.

Table 13 illustrates a PKM message code added for a fast security association procedure according to the embodiment of the present invention.

TABLE 13

| Code | PKM Message Type | MAC Management Message |
|------|------------------|------------------------|
| 0-2 | Reserved | — |
| 3 | SA Add | PKM-RSP |
| 4 | Auth request | PKM-REQ |
| 5 | Auth reply | PKM-RSP |
| 6 | Auth Reject | PKM-RSP |
| . | . | . |
| . | . | . |
| . | . | . |
| 26 | PKMv2 SA-Addition | PKM-RSP |
| 27 | PKMv2 TEK-Invalid | PKM-RSP |
| 28 | PKMv2 Group-Key-Update-Command | PKM-RSP |
| 29 | PKMv2 EAP Complete | PKM-RSP |
| 30 | PKMv2 Authenticated EAP Start | PKM-REQ |
| 31 | PKMv3 Auth Transfer Request | PKM-REQ |
| 32 | PKMv3 Auth Transfer Response | PKM-RSP |
| 33 | PKMv3 Key Request | PKM-REQ |
| 34 | PKMv3 Key Response | PKM-RSP |
| . | . | . |
| . | . | . |
| . | . | . |
| 36-255 | Reserved | — |

Table 13 illustrates a PKM message code added for security association suggested in the embodiment of the present invention. In comparison with a general PKM message code, examples of messages newly defined for the embodiments of the present invention include PKMv3 Auth Transfer Request message, PKMv3 Auth Transfer Response message, PKMv3 Key Request message, and PKMv3 Key Response message.

The PKMv3 auth transfer request message is to request the service base station to transmit the authentication result for the mobile station before handover.

The PKMv3 auth transfer request message is transmitted to the service base station by the mobile station. The service base station transfers the PKMv3 auth transfer request message to the service authentication server (for example, IEEE 802.16 system), and the service authentication server transmits the PKMv3 auth transfer request message to the target network authentication server where handover will be expected. The PKMv3 auth transfer response message is used as a response to the PKMv3 auth transfer request message.

The PKMv3 auth transfer response message can include security contexts used in the authentication server of the target network. If the authentication result for the mobile station transferred to the target network authentication server is not right, the PKMv3 auth transfer response message does not include security contexts of the target network. At this time, the PKMv3 auth transfer response message may not include security context field and protected MS identifier.

The PKMv3 key request message and the PKMv3 key response message are used when the mobile station cannot obtain security contexts used in target heterogeneous radio access networks through exchange of the PKMv3 auth transfer request/response message.

For example, if the authentication result for the mobile station in the service network is not right as described above, the mobile station cannot obtain security contexts from the target base station through the PKMv3 auth transfer request/response messages before handover. In this case, the mobile station can obtain security contexts used in the target base station using the PKMv3 key request/response messages before handover.

If the PKMv3 key request/response messages are used, the PKMv3 auth transfer response message does not include a security context field and a protected MS identifier field. Namely, the aforementioned security context field and the protected MS identifier field information can be transferred to the mobile station in such a manner that they are included in the PKMv3 key response message.

Again, the description of FIG. 4 will be made.

In FIG. 4, the mobile station tries handover for the target network through scanning if a signal level of the service network is reduced to a certain level or less. At this time, the mobile station 400 can transfer authentication related information of the mobile station to the base station 420 using the PKMv3 auth transfer request message (S402).

The service base station 420 which has received the PKM message transfers the authentication related information to the service authentication server 440 through an auth info transfer request message (S403).

In the step S403, the auth info transfer request message can include mobile station temporary identifier (for example, TMSI, IMSI), target access network identifier, and identifier of the current access network authentication server 440.

The service authentication server 440 requests security contexts used in the target authentication server 460 using a security context transfer request message (S404).

The target authentication server 460 transfers the security contexts used in the target authentication server 460 to the service authentication server 440 using a security context transfer response message (S405).

At this time, the security context transfer response message can include identifier of the target access network authentication server 460, security contexts used in the target network, and protected mobile station temporary identifier information.

The service authentication server 440 can transfer the auth info transfer response message to the service base station 420, wherein the auth info transfer response message includes security contexts used in the target network, protected mobile station temporary identifier, MAC address information, and authentication server identifier of the current access network (S406).

The service base station 420 can transfer the authentication related information, such as security contexts used in the target authentication server 460, to the mobile station using the PKMv3 auth transfer response message (S407).

In the embodiment of the present invention, the auth info transfer request/response messages and the security context transfer request/response messages can be transferred using Internet engineering task force (IETF) pre-authentication protocol or AAA protocol.

In accordance with the above steps, the mobile station may not perform the authentication procedure newly in the target to establish security association in the target network while the mobile station is performing handover for the target network. Accordingly, the mobile station can quickly perform handover for heterogeneous radio access network without seamless service.

Figure 5:
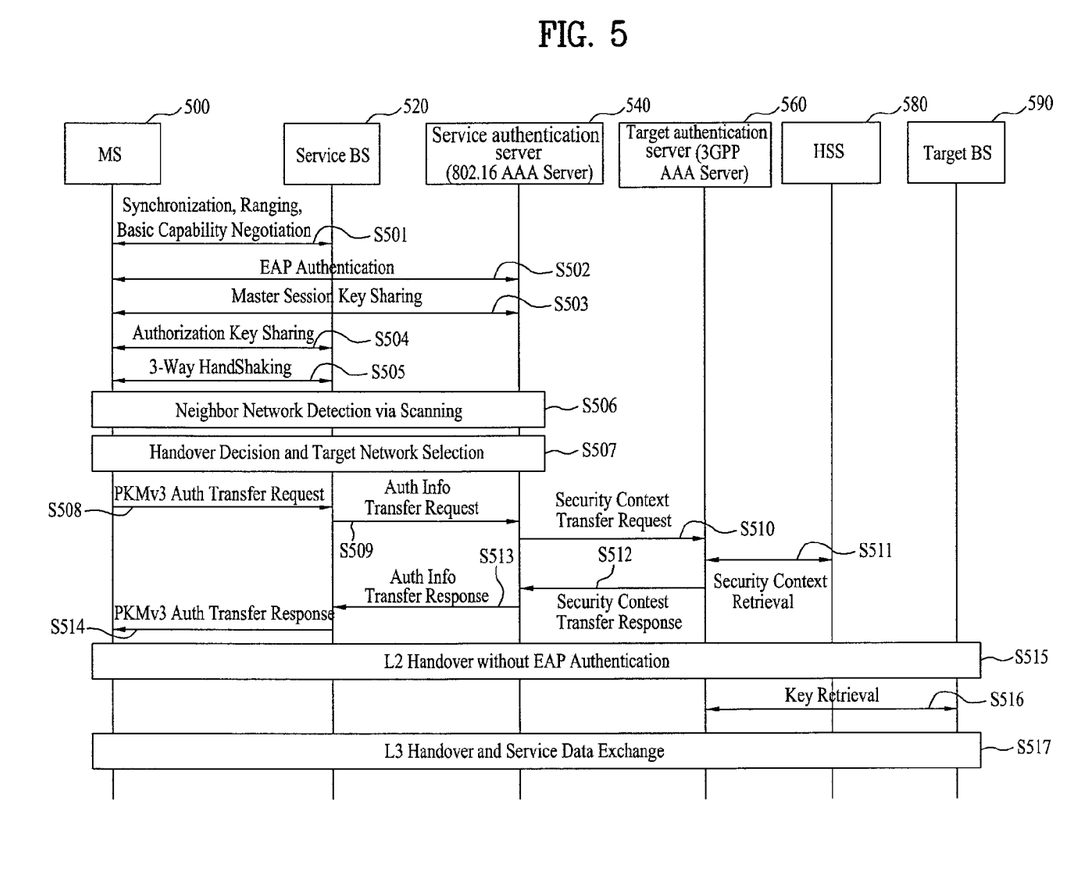
FIG. 5 is a diagram illustrating a method of establishing security association before a mobile station performs handover from a service network to a target network in accordance with another embodiment of the present invention.

FIG. 5 is a diagram illustrating a method of establishing security association before a mobile station performs handover from a service network to a target network in accordance with another embodiment of the present invention.

In FIG. 5, a communication system can include a mobile station (MS) 500, a service base station 520, a service AAA server (802.16 AAA server) 540, a target AAA server (3GPP AAA server) 560, a home subscriber server (HSS) 580, and a target base station 590.

The message used in FIG. 5 is described to effectively represent technical spirits of another embodiment according to the present invention. Accordingly, any message, which performs the function of the message used in FIG. 5, may be used.

In FIG. 5, the steps S501 to S505 are similar to the general authentication procedure of FIG. 2. Namely, the multi-mode mobile station can perform master session key (MSK) sharing and AK sharing through EAP based authentication, and TEK sharing through 3-way handshaking by accessing the IEEE 802.16 network. As a result, the authentication server 540 of the IEEE 802.16 network has information as to whether authentication for the mobile station 500 has been successfully performed, and can use it later during handover between heterogeneous radio access networks.

However, unlike the general authentication procedure, in the steps S501 to S505, the mobile station, the base station, and the service authentication server can smoothly perform the procedure of establishing security association used in the embodiments of the present invention by transmitting and receiving the inter-RAT authorization policy support field to and from one another. In other words, the parameters and fields corresponding to Table 5 to Table 9 are used in the embodiments of the present invention. Hereinafter, the steps S506 and other following steps will be described.

Referring to FIG. 5, the mobile station 500 establishes security association with the service authentication server 540 and performs communication with the service base station 520 if it is subscribed to the service network. At this time, the mobile station 500 performs scanning to perform handover if signal strength with the service base station 520 becomes weak (S506). Namely, the mobile station 500 can receive a signal from a neighbor network through scanning and perform network search and selection procedures.

The mobile station 500 determines handover and selects a neighbor network having the strongest signal strength (S507). At this time, in another embodiment of the present invention, it is assumed that the 3GPP network is used as a possible handover target network.

If the mobile station 500 recognizes that the signal level received from the IEEE 802.16 network has been reduced to a certain level or less, the mobile station 500 can request the IEEE 802.16 network authentication server 540 to transfer authentication related information of the mobile station 500 to a remote target network, i.e., 3GPP network authentication server 560.

For example, the mobile station 500 can transfer authentication related information of the mobile station to the service base station using the PKMv3 auth transfer request message. Also, the PKMv3 auth transfer request message can be transferred to the service base station to request security information used in the target network (S508).

The following Table 14 illustrates an example of an attribute of the PKMv3 auth transfer request message.

TABLE 14

| Attributes | Contents |
| --- | --- |
| Serving Network Identifier | Identifier of current access network (e.g. serving network) |
| Target Network Identifier | Identifier of Target access network |
| Current AS Identifier | Identifier current access network AAA server |
| MS Identifier | Identifier of MS (e.g. IMSI, TMSI) |
| MS MAC Address | MAC address of MS (or, SS) |
| Key Sequence Number | AK sequence number |
| HMAC/CMAC Digest | message digest calculated by using AK |

Referring to Table 14, the PKMv3 auth transfer request message can include digest information of message calculated using current access network identifier, target access network identifier, authentication server identifier of the current access network, mobile station identifier, MAC address of the mobile station, AK sequence number, and AK.

In the step S508, IMSI (international mobile station identity) can be included in the initial PKMv3 auth transfer request message as the mobile station identifier. However, if TMSI (temporary mobile subscriber identity) is allocated from the target network as the mobile station identifier, the mobile station can use the TMSI as its identifier instead of the IMSI.

The 802.16 network base station 520 which has received the PKMv3 auth transfer request message can request the IEEE 802.16 network authentication server 540 to transfer the authentication result for the mobile station 500 identified in the 802.16 network to the 3GPP network authentication server 560 through the auth info transfer request message (S509).

In the step S509, the auth info transfer request message is transmitted using a protocol defined by the IETF. Basically, the auth info transfer request message can include mobile station identifier (TMSI or IMSI), target access network identifier, and identifier of the current access network authentication server 540. Also, the auth info transfer request message can selectively include information such as MAC address of the mobile station 500 and the current access network identifier.

The 802.16 authentication server 540 can transfer the security context transfer request message to the 3GPP authentication server 560. Namely, the 802.16 authentication server 540 can request the 3GPP authentication server 560 to transfer security contexts used in the 3GPP network by using the security context transfer request message (S510).

In the step S510, the security context transfer request message can include target access network identifier, target access network authentication server identifier, mobile station identifier, and a field specifying whether authentication for the corresponding mobile station has been successfully performed. Also, the security context transfer request message can additionally include current access network identifier and identifier of the current access network authentication server 540.

If it is identified that authentication related information for the mobile station is not right, the target authentication server 560 can request re-authentication for the corresponding user. Since the authentication related information is transferred along with time stamp information as well as information as to whether authentication has been performed within the pre-authentication protocol message or AAA protocol message, it has temporal restriction. Namely, since the authentication related information cannot be used if it expires, it is preferable that the authentication related information is updated before it expires.

The 3GPP authentication server 560 which has received the message in the step S510 acquires authentication vectors for the corresponding mobile station by inquiring of the HSS 580 (S511).

The 3GPP authentication server 560 can transmit the security context transfer response message to the 802.16 authentication server 540, wherein the security context transfer response message includes security contexts used in the 3GPP network (S512).

In the step S512, the security context transfer response message can include mobile station identifier, identifier of the access network authentication server (560), security contexts (for example, RAND and kc in case of GSM, and RAND, AUTN, CK and IK in case of UMTS) used in the 3GPP network and protected mobile station temporary identifier information. Also, the security context transfer response message can additionally include identifier of the current access network authentication server 540.

The 802.16 authentication server 540 can transfer the auth info transfer response message to the service base station 520, wherein the auth info transfer response message includes the security contexts obtained in the 3GPP network (S513).

In the step S513, the auth info transfer response message can include one or more of mobile station identifier, security contexts used in the 3GPP network, protected mobile station temporary identifier, MAC address information, and authentication server identifier of the current access network. Also, the auth info transfer response message can selectively include the target access network identifier information.

The service base station 520 can transmit the PKMv3 auth transfer response message to the mobile station 500, wherein the PKMv3 auth transfer response message includes security contexts to be used in the 3GPP network (S514).

Table 15 illustrates an example of the PKMv3 auth transfer response message.

TABLE 15

| Attributes | Contents |
| --- | --- |
| Serving Network Identifier | Identifier of current access network (e.g. serving network) |
| Target Network Identifier | Identifier of Target access network |
| Target AS Identifier | Identifier Target access network AAA server |
| Security contexts | Security contexts used by target network AAA server (e.g. RAND and Kc (in case of GSM), RAND, AUTN, CK and IK etc (in case of UMTS)) |
| Protected MS Identifier | Protected temporary identifier of MS (e,g, TMSI) |
| Key Sequence Number | AK sequence number |
| HMAC/CMAC Digest | Message digest calculated by using AK |

Referring to Table 15, the PKMv3 auth transfer response message can include at least one or more of current access network identifier, target access network identifier, identifier of the target access network authentication server 560, security contexts (for example, RAND and kc in case of GSM, and RAND, AUTN, CK and IK in case of UMTS) used in the target access network, protected mobile station temporary identifier information, AK sequence number, and message digest information calculated using AK.

The mobiles station 500 can previously acquire security related information used in the target base station before handover through the steps S508 to S514. Namely, the mobile station newly performs authentication in the subscription procedure to the 3GPP network, and can omit a considerable part of security procedures of obtaining a new key. Accordingly, the mobile station can perform second layer (L2) handover even without EAP based authentication and the target authentication server (S515).

The 3GPP authentication server 560 transfers security related parameters of a link layer to the target base station 590 to perform safe communication with the mobile station 500 (S516).

Also, the mobile station 500 can transmit and receive data to and from the 3GPP network through third layer (L3) handover and release connection with the previous 802.16 network (S517).

According to another embodiment of the present invention, the auth info transfer request/response messages and the security context transfer request/response messages can be transferred using the IETF pre-authentication protocol or the AAA protocol.

Figure 6:
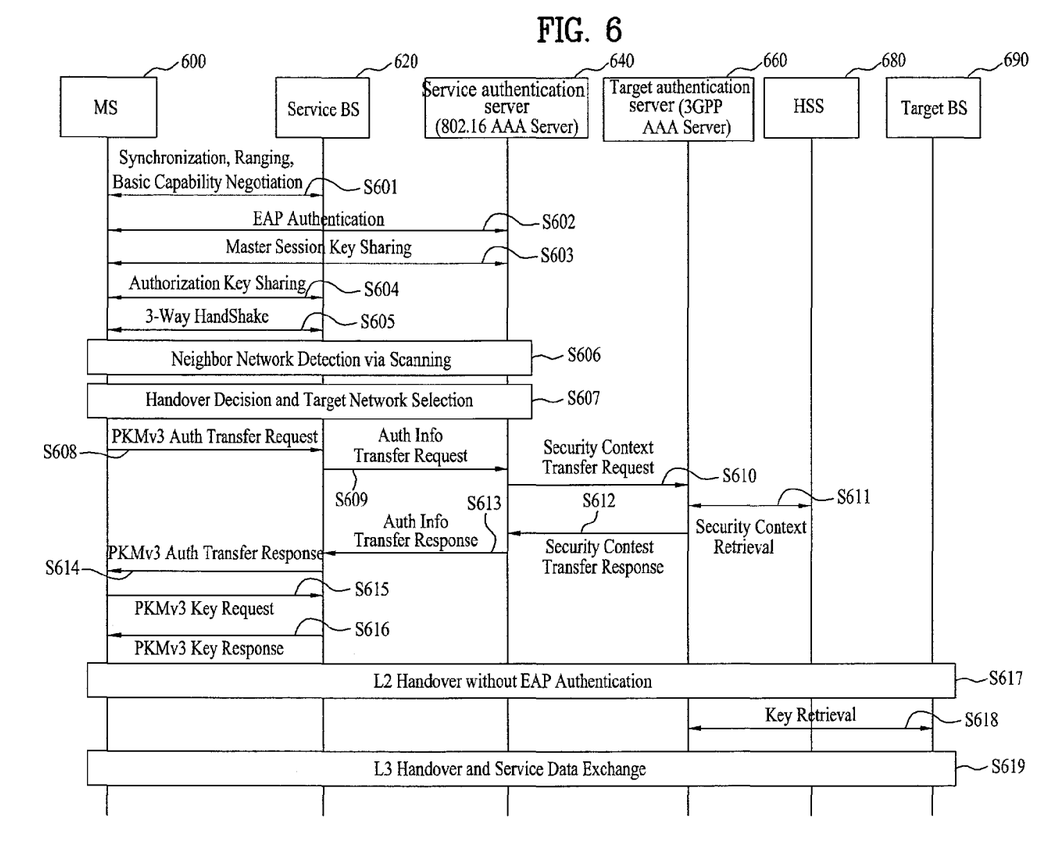
FIG. 6 is a diagram illustrating a method of acquiring security related information of a target base station before a mobile station performs handover in accordance with other embodiment of the present invention.

FIG. 6 is a diagram illustrating a method of acquiring security information of a target base station before a mobile station performs handover in accordance with other embodiment of the present invention.

In FIG. 6, a communication system can include a mobile station (MS) 600, a service base station 620, a service AAA server (802.16 AAA server) 640, a target AAA server (3GPP AAA server) 660, a home subscriber server (HSS) 680, and a target base station 690.

The message used in FIG. 6 is described to effectively represent technical spirits of other embodiment according to the present invention. Accordingly, any message, which performs the function of the message used in FIG. 6, may be used.

In FIG. 6, steps S601 to S613 are similar to the steps S501 to S513 of FIG. 5. Accordingly, their description will be omitted to avoid repeated description.

In the step S613, the service base station 620 can receive security contexts used in the target network authentication server 660 from the service AAA server 640. The service base station 620 can transfer the PKM response message (for example, PKMv3 auth transfer response message) to the mobile station 600, wherein the PKM response message includes security contexts of the target network (S614). At this time, the PKM response message is an example of the PKM message described in FIG. 4.

An example of the PKMv3 auth transfer response message that can be used in the step S614 is illustrated in Table 16 below.

TABLE 16

| Attributes | Contents |
| --- | --- |
| Serving Network Identifier | Identifier of current access network |
| Target Network Identifier | Identifier of target access network |
| Target AS Identifier | Identifier of target access network AAA server |
| Key Sequence Number | AK sequence number |
| HMAC/CMAC Digest | Message digest calculated by using AK |

Referring to Table 16, the PKMv3 auth transfer response message used in FIG. 6 can include at least one or more of current access network identifier, target access network identifier, identifier of the target access network authentication server, AK sequence number, and message digest information calculated using AK.

In other words, the multi-mode mobile station 600 which has received the PKMv3 auth transfer response message in the step S614 can recognize that its authentication information has been safely transferred to the corresponding network through information of target heterogeneous access network identifier and identifier of the target network authentication server 660.

Accordingly, the mobile station can transmit the PKMv3 key request message to the service base station 620 to obtain security contexts to be used in the target network (S615).

The following Table 17 illustrates an example of the PKMv3 key request message.

TABLE 17

| Attributes | Contents |
| --- | --- |
| Key Sequence Number | AK sequence number |
| MS Identifier | Identifier of MS (e.g. IMSI, TMSI) |
| MS MAC Address | MAC address of MS |
| Nonce | Random number generated by MS |
| HMAC/CMAC Digest | Message digest calculated by using AK |

In Table 17, the PKMv3 key request message can include one or more of AK sequence number, mobile station identifier (IMSI, TMSI), MAC address of the mobile station 600, random number generated by the mobile station 600, and message digest information calculated using AK.

In the step S615, the service base station 620 can transmit the PKMv3 key response message to the mobile station 600 in response to the PKMv3 key request message, wherein the PKMv3 key response message includes security contexts of the target network (S616).

The following Table 18 illustrates an example of the PKMv3 key response message.

TABLE 18

| Attributes | Contents |
| --- | --- |
| Key Sequence Number | AK sequence number |
| Security contexts | Security context used by AAA server of target access network (e.g. RAND and Kc (incase of GSM), RAND, AUTN, CK and IK etc (incase of UMTS)) |
| Protected MS Identifier | Protected MS temporary identifier (e.g. TMSI) |
| Nonce | Random number generated by BS |
| HMAC/CMAC Digest | message digest calculated by using AK |

Referring to Table 18, the PKMv3 key response message can include AK sequence number, security contexts used in the target access network authentication server 660, protected mobile station temporary identifier, a random number generated by the base station, and message digest information calculated using AK.

The following steps S617 to S619 are similar to the steps S515 to S517 of FIG. 5. Accordingly, the mobile station 600 can acquire security information used in the target base station of the heterogeneous networks through the PKMv3 key response message before handover. The mobile station 600 can perform handover directly without performing a procedure of establishing new security association with the target authentication server 660.

Also, according to other embodiment of the present invention, the auth info transfer request/response messages and the security context transfer request/response messages can be transferred using the IETF pre-authentication protocol or the AAA protocol.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various technologies of a broadband radio access system. In particular, the embodiments of the present invention can be applied to handover technology between heterogeneous radio access networks. Also, the embodiments of the present invention can be applied to various methods of establishing fast security association before handover is performed.

What is claimed is:

1. A method of establishing security association before an inter-RAT (Radio Access Technology) handover with a target base station (TBS) included in a heterogeneous radio access network is performed, the method comprising:

transmitting, by a mobile station (MS) to a serving base station (SBS), a subscriber station basic capability request (SBC-REQ) message to negotiate capabilities for the inter-RAT handover;

receiving, by the MS from the SBS, a subscriber station basic capability response (SBC-RSP) message in response to the SBC-REQ message, the SBC-RSP message including an inter-RAT parameter indicating that the SBS supports the inter-RAT handover with the heterogeneous radio access network;

transmitting, by the MS to the SBS, a PKM (Privacy Key MAC (Media Access Control)) request message requesting the SBS to transfer authentication related information of the MS to a target network authentication server in the heterogeneous radio access network; and receiving, by the MS from the SBS, a PKM response message before the inter-RAT handover with the TBS is performed, the PKM response message including authentication related information to be used in the heterogeneous radio access network, wherein the inter-RAT handover is performed between heterogeneous radio access networks.

2. The method of claim 1, wherein the PKM request message requests the SBS to transfer the authentication related information including information representing whether a serving network of the MS has successfully performed authentication.

3. The method of claim 1, wherein the authentication related information of the PKM response message includes RAND (RANDom number) and Kc (Ciphering key) if the heterogeneous radio access network is a GSM (Global System for Mobile communication) system, and includes RAND, AUTN (Authentication Token), CK (Ciphering key) and IK (Integrity Key) if the heterogeneous radio access network is a UMTS (Universal Mobile Telecommunication System) system.

4. A method of establishing security association before an inter-RAT (Radio Access Technology) handover with a target base station (TBS) included in a heterogeneous radio access network is performed, the method comprising:

receiving, by a serving base station (SBS) from a mobile station (MS), a subscriber station basic capability request (SBC-REQ) message for negotiating capabilities for the inter-RAT handover;

transmitting, by the SBS to the MS, a subscriber station basic capability response (SBC-RSP) message in response to the SBC-REQ message, the SBC-RSP message including an inter-RAT parameter indicating that the SBS supports the inter-RAT handover with the heterogeneous radio access network;

receiving, by the SBS from the MS, a PKM (Privacy Key MAC (Media Access Control)) request message requesting transfer of authentication related information of the MS to a target network authentication server in the heterogeneous radio access network;

transmitting, by the SBS, an authentication information request message including the authentication related information of the MS to a serving network authentication server;

receiving, by the SBS, an authentication information response message including security related information used in the heterogeneous radio access network from the serving network authentication server; and transmitting, by the SBS to the MS, a PKM response message before the inter-RAT handover is performed, the PKM response message including authentication related information to be used in the heterogeneous radio access network, wherein the inter-RAT handover is performed between heterogeneous radio access networks.

5. The method of claim 4, wherein the PKM request message requests transfer of the authentication related information including information representing whether a serving network of the MS has successfully performed authentication.

6. The method of claim 4, wherein the authentication related information of the PKM response message includes RAND (RANDom number) and Kc (Ciphering key) if the heterogeneous radio access network is a GSM (Global System for Mobile communication) system, and includes RAND, AUTN (Authentication Token), CK (Ciphering Key) and IK (Integrity Key) if the heterogeneous radio access network is a UMTS (Universal Mobile Telecommunication System) system.

7. The method of claim 4, wherein the PKM request message is received and the PKM response message is transmitted using a pre-authentication protocol or an AAA (Authentication, Authorization, and Accounting) protocol.

* * * * *